3,321,418
AMINO FORMALDEHYDE RESIN SOLUTIONS OF DECREASED REACTIVITY, AND SAID SOLUTIONS ADMIXED WITH FILM FORMING PROTEINS
Daniel Dickerson Ritson, Riverside, Conn., assignor to American Cyanamid Company, Stamford, Conn., a corporation of Maine
No Drawing. Filed Apr. 21, 1965, Ser. No. 449,884
5 Claims. (Cl. 260—7)

This is a continuation-in-part of my copending application Ser. No. 213,148 filed on July 30, 1962 and now abandoned.

The present invention relates to a process for diminishing the capacity of aqueous alkaline solutions essentially composed of thermosetting amino-formaldehyde resins and a substantial amount of free formaldehyde to form high viscosity complexes with alkali-soluble film-forming proteins. The invention includes the resin-formaldehyde solutions with and without protein.

The alkali-soluble film-forming proteins are valuable coating agents for a variety of surfaces such as concrete, plaster, wall-board and paper. The principal commercial proteins of this class are casein and soya protein. In aqueous alkali, these proteins form viscous solutions which form thick, tough films when applied to surfaces and dried.

It is known that the presence of a small amount of a thermosetting amino-formaldehyde resin in such alkaline protein solutions tend to render the resulting films water-resistant, particularly when the films have been dried at a temperature at which the amino-formaldehyde resin thermosets.

Aqueous alkaline solutions of thermosetting amino-formaldehyde resins such as have previously been known consists essentially of the thermosetting resin, free (i.e., unreacted) formaldehyde, and a non-volatile base in sufficient amount to render the solution alkaline. The free formaldehyde possesses the property, here undesirable, of reacting with film-forming proteins in aqueous alkali solution to form high molecular weight products (hereinafter termed "complexes"). It is not unusual for the minimum effective amount, for water-proofing purposes, of an alkaline thermosetting amino-formaldehyde solution containing a small amount of unreacted formaldehyde to cause the viscosity of the protein solution to increase by a factor of three or four. Since the reacted formaldehyde in the thermosetting resin is in equilibrium with the free formaldehyde in the solution, it has been generally believed that chemical inactivation of the free formaldehyde would cause a corresponding deterioration in the thermosetting (and therefore in the waterproofing) powers of the amino-formaldehyde resin.

The discovery has now been made that the capacity of aqueous solutions essentially composed of a thermosetting amino-formaldehyde resin, free formaldehyde, and a non-volatile base in sufficient amount to render the solutions alkaline to form high viscosity-producing complexes with film-forming proteins in aqueous solution can be diminished by reacting at least part of the free formaledhyde in the resin solution with ammonium hydroxide before the resin solution is combined with the protein solution.

The present invention has shown itself capable of preventing nearly half of the increase in viscosity that would otherwise occur, and this is done without adverse effect upon the capacity of the protein-amino resin composition to form water-resistant coatings. The present invention thus permits a substantial decrease in the power required to apply the aforementioned coating compositions and permits application of fluid coating compositions having higher solids contents than would otherwise be the case.

The process of the present invention is performed by incorporating the desired amount of ammonium hydroxide into a thermosetting amino-formaldehyde resin solution, which is already alkaline as the result of the presence of a non-volatile base therein, after which the solution is allowed to stand at room or at elevated temperature until the ammonium hydroxide has come into substantial equilibrium with the free formaldehyde.

The present invention is applicable only to amino-formaldehyde resin solutions containing a nonvolatile base and more than 3% by weight of free formaldehyde, because this is about the smallest amount of formaldehyde which causes a serious increase in the viscosity of the protein solution, and it is not obvious to add more of a base to a resin solution which is already sufficiently alkaline for general purposes. The minimum amount of ammonium hydroxide which is added is that needed to react with ⅓ of this free formaldehyde because this is about the smallest amount of free formaldehyde which when reacted justifies practice of the present invention.

It is preferred to add sufficient ammonium hydroxide to react with at least ⅔ of the free formaldehyde present. The addition of this amount of ammonium hydroxide results in a major improvement in viscosity and renders practice of the process of major practical utility.

The preferred amount of ammonium hydroxide to be added in any one instance depends on such variables as the temperature of the solution and the concentration of resin in the solution. However, this amount is readily found by laboratory trial as shown in the examples which follow.

The strength of the ammonium hydroxide introduced is not critical. We prefer to add concentrated ammonium hydroxide (or to accomplish the same result by injection of a suitable amount of ammonia) so as to minimize the amount of water added.

The temperature of the resin solution on introduction of the ammonium hydroxide may vary from room temperature to quite hot. However, the ammonium hydroxide reaction is exothermic, so that a high temperature is not needed.

The reaction is deemed complete when the exotherm subsides. The resulting treated resin solution is then stirred into the film-forming protein solution, which can then be used in customary manner.

The protein solutions benefited by the present invention are prepared by dispersing film-forming protein in hot, highly alkaline water or by other convenient method. The protein:water ratio is controlled so that the solution has a vicosity appropriate for the coating use intended.

If desired, materials customarily present in coating compositions may be added at the appropriate stage of the preparation. These materials include pigments (for example clay, satin white, calcium carbonate, titanium dioxide, ultramarine, and phthalocyanine blue); mold growth inhibitors such as hexachlorophenol, and perfume to mask any odor present. The present invention does not depend on the presence or absence of these materials.

The thermosetting aqueous amino-formaldehyde resin solutions are prepared in known manner by condensing an amidogen (for example, melamine, urea, dicyandiamide, formoguanamine, biuret, and mixtures thereof) with sufficient formaldehyde to yield a thermosetting product. The reaction is principally performed on the alkaline side, by use of a nonvolatile base, which may be sodium hydroxide, potassium hydroxide, sodium carbonate (soda ash), sodium tetraborate, trisodium phosphate or triethanolamine, and the product is a resinous syrup in which the product most probably is a low polymer. The product is consequently an aqueous alkaline solution essentially composed of a thermosetting amino-formaldehyde resin, more than 3% by weight of free formaldehyde, and a non-volatile base.

If desired, the product may be reacted also in known manner with methanol to form methylated amino-formaldehyde condensates. The reaction of the amidogen with the formaldehyde is usually not complete, so that the resulting resin syrup usually has a small but appreciable content of formaldehyde. When the methylation reaction is performed, the final resin syrup usually has a content of unreacted methanol.

The invention will be further described by the examples which follow, which illustrate the invention without limiting it.

EXAMPLE 1

The following illustrates the process of the present invention in inhibiting formation of high-viscosity complexes when a small amount of an alkaline solution of a formaldehyde-containing amino-formaldehyde resin is mixed with an aqueous alkaline pigmented paper coating composition containing a film-forming protein.

The amino-formaldehyde resin solution used is composed substantially of a 1:1 molar mixture of tri(hydroxymethyl) di(methoxymethyl) melamine and an 80% methylated di(hydroxymethyl) urea (or low polymers thereof). The solution used contains 3.5% by weight of free formaldehyde, a slightly greater amount of free methanol, and 72.5% by weight (PMMA) of solids, i.e., 80% by weight of the foregoing melamine and urea compounds, plus the free methanol and free formaldehyde. In addition, the solution contains sufficient sodium hydroxide so that it has a pH of 8.5.

The weight of free formaldehyde present is determined according to the sodium sulfite method. According to this method, a 2.5 g. sample of the solution is weighed into a 300 ml. beaker containing 100 ml. of water, and 12 drops of thymolphthalein indicator (0.1% in alcohol), 15 cc. of 1/N HCl, and 25 ml. of saturated aqueous sodium sulfite solution are added and the mixture is stirred for 30 seconds. Excess acid is titrated with standard 1/N NaOH. The ml. of HCl × normality × 0.03 × 100 ÷ weight of sample = percent free formaldehyde One 100-g. sample of the resin solution is withdrawn and to this is added with stirring 9 cc. of 26 Bé (60%) ammonium hydroxide. The pH of the solution rises to 10.5, and the solution becomes warm. The solution is allowed to stand for a few hours, at the end of which time the reaction is complete. The resulting solution contains 1.5% by weight of free formaldehyde. The amount of ammonium hydroxide added is about 1.8 equivalents based on the formaldehyde, and is therefore about 80% in excess of the stoichiometric equivalent therefor. The pH of the solution slowly drops to 9.5.

A casein paper-coating composition containing clay as pigment is prepared by stirring 333 g. of a 15% by weight ammonium caseinate solution having an alkaline pH and 82 g. of water into 735 g. of a 68% by weight clay slurry.

Three 256-g. samples of this dispersion (containing 48% total solids) are withdrawn. One is reserved as control, and to this nothing is added. To the second is added 1.4 g. of the original (untreated) melamine-urea-formaldehyde resin solution diluted with 1.4 g. of water and having a pH of 8.5. To the third is added 1.5 g. of the alkaline melamine-urea-formaldehyde resin solution which had been treated with ammonium hydroxide diluted with 1.3 g. of water and which had a pH of 9.5.

The three compositions are stirred and their viscosities are determined at 20° C.

The compositions are then applied to 50-lb. coating raw stock sheets by means of a 0.00075″ Bird applicator. The sheets are dried at 300° F. for one minute and calendered. The wet rub resistance of the coating on the sheets is determined by standard laboratory test using 0.02% sodium hydroxide solution as the wetting liquid. The results are reported on a scale of 10 on which 0 designates rapid and extensive removal of the coating, 10 designates no removal of the coating, and intermediate values designate removal of intermediate amounts of the coatings. On this scale paper coated with a pigmented starch coating composition gives a value of 0. A value of 7 is considered commercially satisfactory. Results are as follows:

|  | Sample | | |
| --- | --- | --- | --- |
|  | 1 | 2 | 3 |
| Composition, parts by weight: | | | |
| Clay | 100 | 100 | 100 |
| Casein | 10 | 10 | 10 |
| Melamine-urea-CH₂O resin | None | 1 | 1 |
| Sodium hydroxide | Note 1 | Note 1 | Note 1 |
| NH₄OH (added to resin solution) | None | None | Yes |
| Properties: | | | |
| Viscosity, cps | 1,208 | 4,160 | 2,440 |
| Increase, percent | | 344 | 202 |
| Results: Wet rub test | 2 | 9 | 9 |

1. Sufficient to give resin solution a pH of 8.5.

The results show that the ammonium hydroxide added to the resin solution decreased the viscosity of the coating composition by 41.2% without detriment to the wet rub properties of the composition.

EXAMPLE 2

The procedure of Example 1 is repeated except that the amino-formaldehyde resin is obtained from a different batch prepared in slightly different manner, and a number of samples are withdrawn and different amounts of ammonium hydroxide are added to each as shown in the table below with results as follows:

| Run No. | Cc. NH₄OH Added | Viscosity | |
| --- | --- | --- | --- |
| | | Cp. | Percent Decrease |
| 1 (Control) | None | 3,600 | |
| 2 | 2 | 3,500 | 2.8 |
| 3 | 4 | 2,950 | 18.1 |
| 4 | 6 | 1,950 | 47.2 |
| 5 | 8 | 1,800 | 50.0 |

I claim:
1. A process for diminishing the capacity of an aqueous alkaline solution consisting essentially of a thermosetting amino-formaldehyde resin, more than 3% by weight of free formaldehyde, and a non-volatile base to form high viscosity producing complexes with film-forming proteins in aqueous alkaline solution, which consists in reacting at least ⅓ of said free formaldehyde with ammonium hydroxide.

2. A process according to claim 1 wherein the thermosetting amino-formaldehyde resin is a thermosetting methylated amino-formaldehyde resin.

3. A process for diminishing the capacity of an aqueous alkaline solution consisting essentially of a thermosetting amino-formaldehyde resin, more than 3% by weight of free formaldehyde, and a non-volatile base to form high viscosity producing complexes with proteins in aqueous alkaline solution, which consists in reacting at least ⅔ of such formaldehyde with ammonium hydroxide.

4. In the formation of a fluid aqueous coating composition wherein an aqueous alkaline solution consisting essentially of a thermosetting amino-formaldehyde resin, more than 3% by weight of free formaldehyde, and a non-volatile base is mixed with an aqueous alkaline solution of a film-forming protein, the method of diminishing the amount of high viscosity producing complexes thereby formed, which consists in reacting at least ⅓ of said free formaldehyde with ammonium hydroxide before said resin solution is mixed with said protein solution.

5. In the formation of a fluid aqueous coating composition wherein an aqueous alkaline solution consisting essentially of a thermosetting methylated amino-formaldehyde resin, more than 3% by weight of free formaldehyde, and a non-volatile base is mixed with an aqueous alkaline casein papercoating composition, the method of diminishing the amount of high viscosity producing complexes thereby formed, which consists in reacting at least ⅔ of said free formaldehyde with ammonium hydroxide before said resin solution is mixed with said aqueous casein papercoating composition.

References Cited by the Examiner

UNITED STATES PATENTS 2,236,184  3/1941  Menger _____ 260—71

FOREIGN PATENTS 577,661  6/1959  Canada.

WILLIAM H. SHORT, *Primary Examiner.*

J. NORRIS, *Assistant Examiner.*